US012481772B2

United States Patent
Baughman et al.

(10) Patent No.: US 12,481,772 B2
(45) Date of Patent: Nov. 25, 2025

(54) AUTOMATICALLY ADJUSTING DATA ACCESS POLICIES IN DATA ANALYTICS

(71) Applicant: International Business Machines Corporation, Armonk, NY (US)

(72) Inventors: Aaron K Baughman, Cary, NC (US); Shikhar Kwatra, San Jose, CA (US); Vijay Ekambaram, Chennai (IN); Smitkumar Narotambhai Marvaniya, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 598 days.

(21) Appl. No.: 17/103,118

(22) Filed: Nov. 24, 2020

(65) Prior Publication Data

US 2022/0164457 A1    May 26, 2022

(51) Int. Cl.
*G06F 21/00*    (2013.01)
*G06F 21/60*    (2013.01)
(Continued)

(52) U.S. Cl.
CPC ............ *G06F 21/604* (2013.01); *G06F 21/62* (2013.01); *G06N 3/08* (2013.01)

(58) Field of Classification Search
CPC ..... G06F 21/62; G06F 21/604; G06N 3/0895; G06N 3/091; G06N 3/094; G06N 3/0985; G06N 3/088; G06N 3/08; G06N 3/045
See application file for complete search history.

(56) References Cited

U.S. PATENT DOCUMENTS 8,209,402 B1    6/2012    Smith et al.
8,429,307 B1 *  4/2013    Faibish ................ G06F 3/0689
                                                                710/33
(Continued)

FOREIGN PATENT DOCUMENTS

CN    110784316 A    2/2020
CN    116490871 A    7/2023
(Continued)

OTHER PUBLICATIONS

Exploiting the Auto-Encoder Residual Error for Intrusion Detection (Year: 2019).*

(Continued)

*Primary Examiner* — Kevin Ayala
(74) *Attorney, Agent, or Firm* — Garg Law Firm, PLLC; Rakesh Garg; Michael O'Keefe

(57) ABSTRACT

From a first model parameter, an autoencoder network is generated. A reconstruction error for the autoencoder network is measured, the reconstruction error comprising a difference between an input to the autoencoder network and a corresponding output from the autoencoder network, the input to the autoencoder network comprising a portion of an initial set of data. The reconstruction error and a confidence score corresponding to a complexity level of the autoencoder network are aggregated into a level of difficulty score of the autoencoder network. From the level of difficulty score and an initial data access policy level corresponding to the initial set of data, a derived data access policy level corresponding to the initial data access policy level is generated, the derived data access policy level enforcing access to a transformed set of data generated by applying a transformation to the initial set of data.

20 Claims, 13 Drawing Sheets

(51) Int. Cl.
*G06F 21/62* (2013.01)
*G06N 3/08* (2023.01)

(56) References Cited

U.S. PATENT DOCUMENTS

| | | | |
|---|---|---|---|
| 8,447,782 | B1 | 5/2013 | Vipul et al. |
| 8,719,326 | B2 | 5/2014 | Richard |
| 9,479,556 | B2 | 10/2016 | Voss et al. |
| 9,668,699 | B2 | 6/2017 | Georgescu et al. |
| 9,916,538 | B2 | 3/2018 | Zadeh et al. |
| 10,616,281 | B1 | 4/2020 | Chud |
| 2011/0321117 | A1* | 12/2011 | Nestler ............... G06F 21/604 726/21 |
| 2014/0310211 | A1* | 10/2014 | Markert ............... G06N 20/00 706/12 |
| 2015/0222606 | A1 | 8/2015 | Yan |
| 2016/0050297 | A1 | 2/2016 | Koifman et al. |
| 2016/0104002 | A1 | 4/2016 | Schneider et al. |
| 2019/0327271 | A1 | 10/2019 | Saxena et al. |
| 2020/0167427 | A1* | 5/2020 | Filoti .................. G06N 3/08 |
| 2020/0202179 | A1* | 6/2020 | Rajarathinam ......... G06N 5/04 |
| 2020/0213336 | A1 | 7/2020 | Yu et al. |
| 2020/0364588 | A1* | 11/2020 | Knox .................. G06V 40/20 |
| 2021/0397938 | A1 | 12/2021 | Tora et al. |

FOREIGN PATENT DOCUMENTS

| | | |
|---|---|---|
| DE | 112021006167 T5 | 9/2023 |
| GB | 2616199 A | 8/2023 |
| JP | 2008-181290 A | 8/2008 |
| JP | 2014115685 A * | 6/2014 |
| JP | 2020-140580 A | 9/2020 |
| JP | 2023-550445 A | 12/2023 |
| WO | 2022/111112 A1 | 6/2022 |

OTHER PUBLICATIONS

Ali and Yangyu, Automatic Modulation Classification Using Deep Learning Based on Sparse Autoencoders With Nonnegativity Constraints (Nov. 2017) (Year: 2017).*

Hou et al. Deep Feature Consistent Variational Autoencoder arXiv: 1610.00291v1 [cs.CV] Oct. 2, 2016 (Year: 2016).*

Foster, David. Generative Deep Learning, O'Reilly Media Inc. (Jun. 2019) (Year: 2019).*

Kingma et al., An Introduction to Variational Autoencoders, Foundations and Trends in Machine Learning, Dec. 11, 2019.

Rosenbaum, Dynamic Composition of Functions for Modular Learning, University of Massachusetts Amherst, Mar. 2020.

Chollet, Deep Learning with Python, Manning, 2019.

Ip.com, Ranking and Automatic Selection of Machine Learning Models, Jan. 3, 2018.

Ip.com, User Interface and Application Programming Interface for Explaining Personalized Machine-Learned Model Outputs, Jan. 3, 2018.

Prabhu, Security & Privacy considerations in Artificial Intelligence & Machine Learning—Part-6: Up close with Privacy, Towards Data Science, Feb. 8, 2019, https://towardsdatascience.com/security-privacy-in-artificial-intelligence-machine-learning-part-6-up-close-with-privacy-3ae5334d4d4b.

Piatetsky, Will GDPR Make Machine Learning Illegal?, KDnuggets, 2018, https://www.kdnuggets.com/2018/03/gdpr-machine-learning-illegal.html.

Mesa Community College, Inverse Functions, https://www.mesacc.edu/~scotz47781/mat120/notes/inverse/find_inverse/inverse_functions_intro.pdf, 2020.

International Searching Authority, PCT/CN2021/123849, Jan. 14, 2022.

Japan Patent Office, "Decision to Grant a Patent," Jan. 23, 2025, 5 Pages, JP Application No. 2023-530328.

Flores Steven. "Variational Autoencoders are Beautiful", Comp Three Inc., Apr. 15, 2019, 8 pages.

D'Souza et al., "Autoencoder as a New Method for Maintaining Data Privacy While Analyzing Videos of Patients With Motor Dysfunction: Proof-of-Concept Study", Journal of Medical Internet Research, vol. 22, Issue 5, 2020, 07 pages.

German Patent and Trademark Office, " Office Action," Jun. 3, 2025, 14 Pages, DE Application No. 112021006167.4.

* cited by examiner

AUTOMATICALLY ADJUSTING DATA ACCESS POLICIES IN DATA ANALYTICS

BACKGROUND

The present invention relates generally to a method, system, and computer program product for adjusting data access policies. More particularly, the present invention relates to a method, system, and computer program product for automatically adjusting data access policies in data analytics.

In a data analytics pipeline, or data analysis pipeline, input data is received and processed, and the results output. Some implementations include more than one processing step, or layer, in which the output of a step is used as the input to the next step, in a pipeline or series arrangement. Each processing step is called a transformation, although the data itself is not required to be changed. In some implementations, for example when processing time-series data, the input data is a continuous stream and the output data is a result of processing the input stream. In other implementations, the input data is a discrete batch of data rather than a continuous stream and the output data is also a discrete batch of data.

In data analytics, a column, also called an attribute or data attribute, is a set of data values of a particular type. A row holds data for an instance of each column. Thus, a row-column intersection holds a particular data value for each attribute. For example, in a set of employee data, there might be columns labelled Name, Salary, Birth Month, Address, and Phone. Each row of data might hold data for one particular employee, e.g. Jane Smith's name, salary data, birth month (for use in planning team-building events), address, and mobile telephone number. Data attributes are also referred to as columns even when data is not actually stored in a two-dimensional, row-column format.

A data access policy controls which entities can access particular data. In one data access policy implementation, data columns or attributes are each assigned a data access level on a scale from least (e.g., 1) to most (e.g., 5) protected. Data accessing entities are also assigned a data access level on the same scale, depending on a combination of ability to protect and need to know the protected data. Only a data accessing entity with a data access level equal to or higher than the attribute's data access level is permitted to access that data. For example, a data access system assigned to an administrative assistant might be assigned a data access level of 1, allowing access to data also assigned a data access level of 1, such as employee birth month data, but not data assigned a higher data access level. However, a payroll processing system might be assigned a data access level of 4, allowing access to data assigned data access levels of 1-4, including an employee's salary data (with a data access level of 4).

SUMMARY

The illustrative embodiments provide a method, system, and computer program product. An embodiment includes a method that generates, from a first model parameter, an autoencoder network. An embodiment measures a reconstruction error for the autoencoder network, the reconstruction error comprising a difference between an input to the autoencoder network and a corresponding output from the autoencoder network, the input to the autoencoder network comprising a portion of an initial set of data. An embodiment aggregates, into a level of difficulty score of the autoencoder network, the reconstruction error and a confidence score corresponding to a complexity level of the autoencoder network. An embodiment generates, from the level of difficulty score and an initial data access policy level corresponding to the initial set of data, a derived data access policy level corresponding to the initial data access policy level, the derived data access policy level enforcing access to a transformed set of data generated by applying a transformation to the initial set of data.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
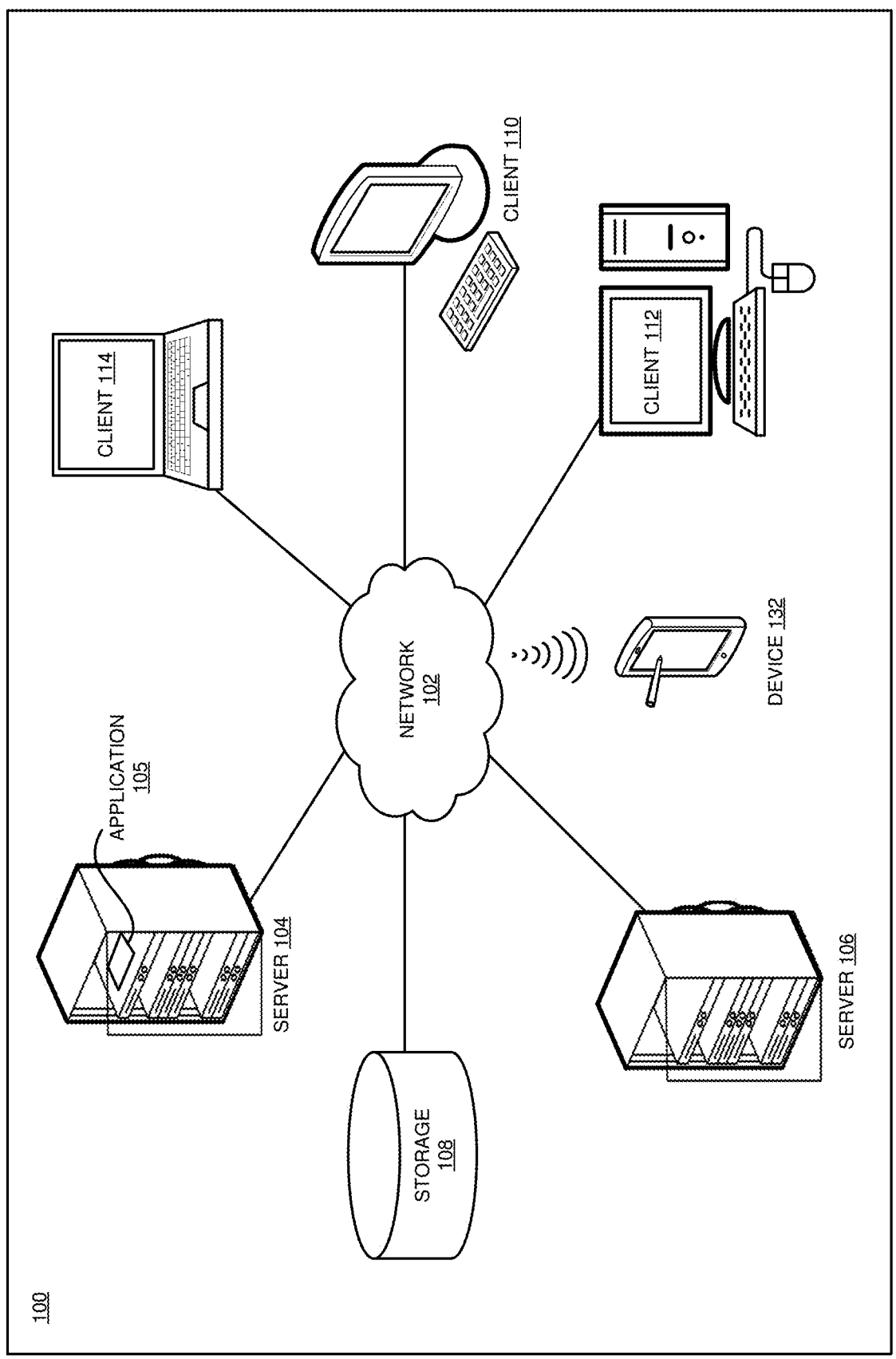
FIG. 1 depicts a block diagram of a network of data processing systems in which illustrative embodiments may be implemented.

The illustrative embodiments recognize that, if input data to an analytics operation is protected by a data access policy, the output of the analytics operation, also called derived data, is likely to need appropriate protection as well. If the derived data is not sufficiently protected, an unauthorized entity could potentially access and analyze the derived data to recover the original, input data. However, protecting already publicly available data or data that poses no risk if made publicly available is unnecessary and adds complexity to data processing operations. Thus, the illustrative embodiments recognize that there is a need to determine a data access policy for derived data.

The illustrative embodiments also recognize that, presently, human experts implement a data access policy for derived data, including manually setting a particular data access policy level. The setting is based on a combination of simple categorical rules (e.g. all health-related data or all payroll-related data must have at least a particular data access policy level), whether or not the human believes the derived data to be sufficiently anonymized, and the expert's instinct. However, an expert's determinations can vary over time, and different experts often produce inconsistent results. As well, analytics operations are often not one-to-one but many-to-many, and become more complex over time as more operations are added to an analytics pipeline. As a result, the data access policy analysis becomes too complex for humans to perform accurately, resulting in over- or under-protection. In addition, experts' determinations rarely take into account the particular degree of difficulty of analyzing a particular set of derived data to recover original data. Consequently, the illustrative embodiments recognize that there is a need to automatically determine a data access policy level for derived data, based on the data access policy level of the original data and the difficulty of recovering the original data from derived data.

The illustrative embodiments recognize that the presently available tools or solutions do not address these needs or provide adequate solutions for these needs. The illustrative embodiments used to describe the invention generally address and solve the above-described problems and other problems related to automatically adjusting data access policies in data analytics.

An embodiment can be implemented as a software application. The application implementing an embodiment can be configured as a modification of an existing data analytics system, as a separate application that operates in conjunction with an existing data analytics system, a standalone application, or some combination thereof.

Particularly, some illustrative embodiments provide a method that measures a level of difficulty score associated with recovering the original data from the derived data and generates, from the level of difficulty score and an initial data access policy level corresponding to the initial set of data, a derived data access policy level.

One embodiment measures a level of difficulty score associated with recovering the original data from the derived data, by determining an inverse of the transformation from a column or attribute of original data to a column or attribute of derived data. In particular, the embodiment uses a set of original data and a set of data derived from the original data to fit a model to the inverse transformation, i.e. the transformation from derived data to original data. One embodiment fits the model by performing a predetermined series of regression steps. At the end of the regression steps, the embodiment determines an error metric of the inverse transformation. One non-limiting example of an error metric is the difference between the model's prediction of the original data and the actual original data. An embodiment converts the error metric to a level of difficulty score. A level of difficulty score represents the difficulty of recovering the original data from the derived data. The lowest level of difficulty score in a predetermined range represents derived data that is equal to the original data or original data that is trivially easy to recover from the derived data. Higher level of difficulty scores represent correspondingly more difficult recovery operations, due to the processing time required to generate a sufficiently accurate model or the complexity of the generated model. One embodiment converts the error metric to a level of difficulty score by normalizing the error metric to a zero to one range, where zero represents the lowest level of difficulty score and one represents the highest level of difficulty score. Other techniques to converts the error metric to a level of difficulty score, and other level of difficulty score ranges, are also possible and contemplated within the scope of the illustrative embodiments.

However, measuring a level of difficulty score associated with recovering the original data from the derived data by determining the difficulty of transforming the derived data back to the original data is only possible when the original and derived data are in a one-to-one relationship. Consequently, another embodiment measures a level of difficulty score using another method.

An autoencoder network is a lossy data compression algorithm comprising an encoder section and a decoder section. The encoder section converts a unit of input data (e.g., one row-column intersection) to an encoded form, and the decoder section converts the encoded form into reconstructed data. The difference between the reconstructed data and the original input data is referred to as reconstruction loss or reconstruction error. One or more model parameters define a particular configuration of an autoencoder network. For example, when both the encoder and decoder sections are implemented as fully connected neural networks having one or more layers, some non-limiting examples of model parameters are the number and size of hidden layers in each of the encoder and decoder sections, the number of dimensions of the encoded form of the data, the number of training epochs used in training a particularly-configured autoencoder network, the loss function used to train a particularly-configured autoencoder network, the rate at which a particularly-configured autoencoder network should learn, the dropout rate (the probability of training a given node in a layer), and any learning rate optimizer used during training. A loss function measures a difference between an actual output of a neural network and a desired output of the neural network, thus training a neural network seeks to minimize the loss function.

An embodiment generates an autoencoder network from one or more model parameters. In embodiments, one or more model parameters are set to default values, set by a human expert based on knowledge of the data to be processed by an analytics operation, generated automatically, or set using another presently known technique or combination of techniques.

An embodiment trains the generated autoencoder network according to one or more model parameters. An embodiment uses, as training data, a set of original data and a set of data derived from the original data. One embodiment uses, as a loss function during training, the reconstruction error of the autoencoder network when processing the training set of original data. Another embodiment uses, as a loss function during training, a difference between the encoded form of original training data (the output of the autoencoder network's encoder section) and corresponding derived training data. Another embodiment trains the autoencoder network to minimize both loss functions.

Once an embodiment has trained the generated autoencoder network for the specified number of training epochs, the embodiment measures the network's reconstruction error and complexity level. To measure the network's complexity level, an embodiment combines model parameters that relate to model complexity into a common complexity level. One embodiment adds the number and size of hidden layers in each of the encoder and decoder sections and the number of dimensions of the encoded form of the data into a complexity level. Another embodiment also includes a number of training epochs used in training a particularly-configured autoencoder network in the complexity level measurement.

Because a more complex autoencoder network should have a lower reconstruction error than a less complex autoencoder network, when processing the same data, an embodiment uses the complexity level as a confidence score corresponding to the reconstruction error of a generated autoencoder network.

Another embodiment generates a set of autoencoder networks by varying one or more model parameters. For example, an embodiment might generate three autoencoder networks, each with a different number of hidden layers, a different number of dimensions of the encoded form of the data, or both. The embodiment trains the generated set of autoencoder networks according to each network's model parameters and measures each network's reconstruction error and complexity level in a manner described herein. Analyzing multiple autoencoder networks often produces a more accurate determination of the level of difficulty of using derived data output from an analytics operation to recover the initial data, at the expense of additional analysis time.

An embodiment aggregates one or more autoencoder networks' reconstruction error and corresponding complexity level into a level of difficulty score. One embodiment computes a level of difficulty score by averaging one or more autoencoder networks' reconstruction error. Another embodiment computes a level of difficulty score by averaging one or more autoencoder networks' reconstruction error, with each network having a complexity level above or below a threshold complexity level. Another embodiment uses, as a level of difficulty score, the reconstruction error of the network with the lowest reconstruction error. Another embodiment uses, as a level of difficulty score, the reconstruction error of the network with the lowest reconstruction error, the network also having a complexity level above or below a threshold complexity level. The level of difficulty score represents a level of difficulty involved in using derived data output from an analytics operation to recover the initial data.

One embodiment determines a level of difficulty score for an autoencoder network generated from an initial set of model parameters, varies one or more model parameters from their initial setting, and generates a corresponding set of autoencoder networks. The embodiment trains the generated set of autoencoder networks according to each network's model parameters, measures each network's reconstruction error and complexity level, and aggregates the networks' reconstruction error and corresponding complexity level into a new level of difficulty score, in a manner described herein. Determining an initial level of difficulty score, as a baseline, and generating and analyzing additional networks based on that baseline, helps to constrain the generation of additional networks to those that are expected to be most useful in assessing an overall level of difficulty.

An embodiment uses the level of difficulty score and a data access policy level of the initial data to determine a data access policy level of the derived data. For example, if the level of difficulty score is low (e.g. 1 on a 0-5 scale), indicating that recovering initial data from derived data is not difficult at all, the data access policy level of the derived data should be equal to the data access policy level of the initial data. On the other hand, if the level of difficulty score is high (e.g. 4.5 on a 0-5 scale), indicating that recovering initial data from derived data is very difficult, the data access policy level of the derived data can be lowered, or relaxed, relative to the data access policy level of the initial data.

The manner of automatically adjusting data access policies in data analytics described herein is unavailable in the presently available methods in the technological field of endeavor pertaining to data analytics. A method of an embodiment described herein, when implemented to execute on a device or data processing system, comprises substantial advancement of the functionality of that device or data processing system in generating an autoencoder network from a model parameter, measuring a reconstruction error of the autoencoder network, aggregating the reconstruction error and a confidence score into a level of difficulty score of the autoencoder network, and generating, from the level of difficulty score and an initial data access policy level corresponding to the initial set of data, a derived data access policy level.

The illustrative embodiments are described with respect to certain types of contents, transmissions, delays, events, climactic events, non-climactic events, periods, forecasts, thresholds, validations, responses, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
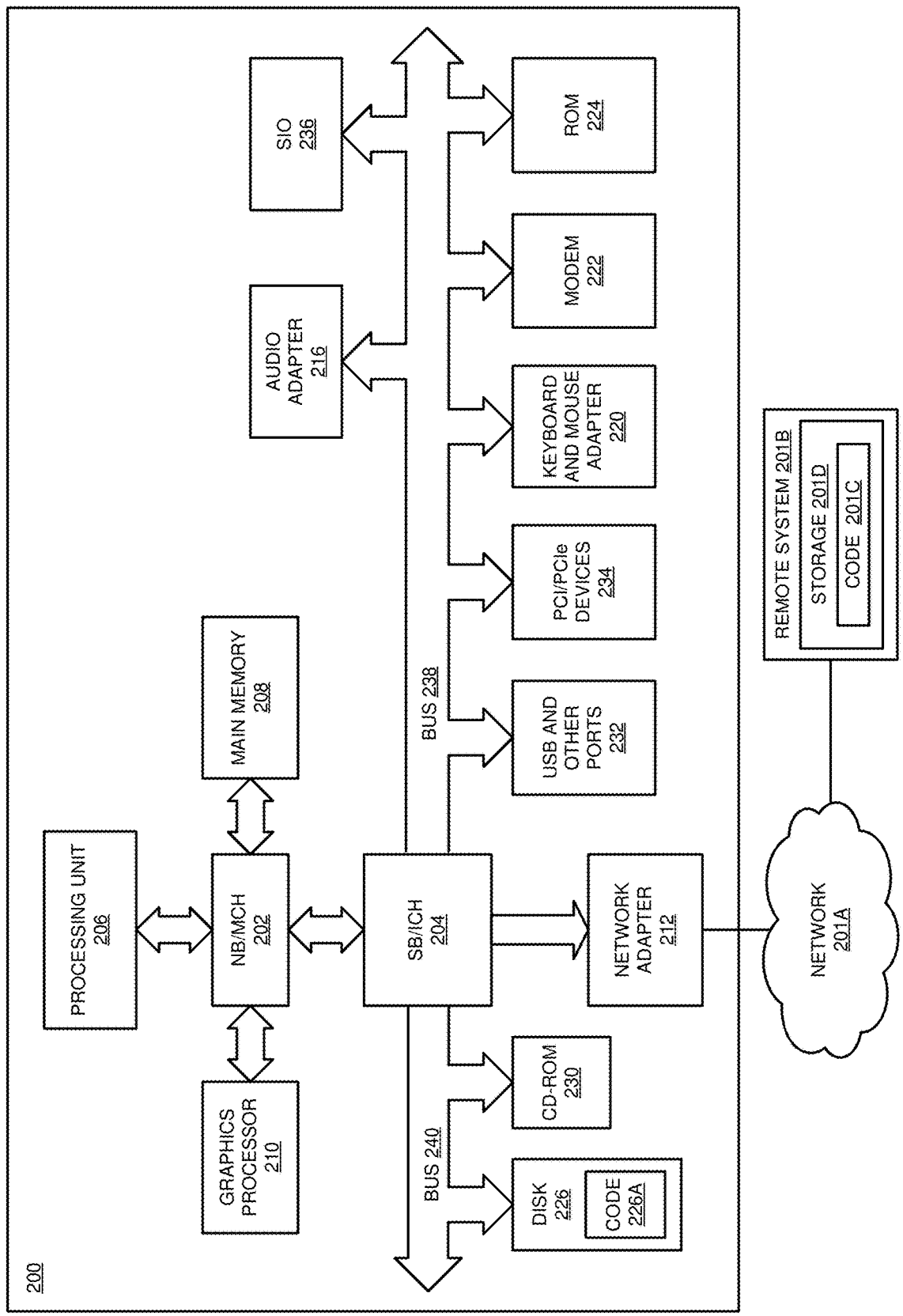
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. In addition, the analytics pipeline can execute in any of servers 104 and 106, clients 110, 112, and 114, and device 132, and need not execute in the same device as application 105.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
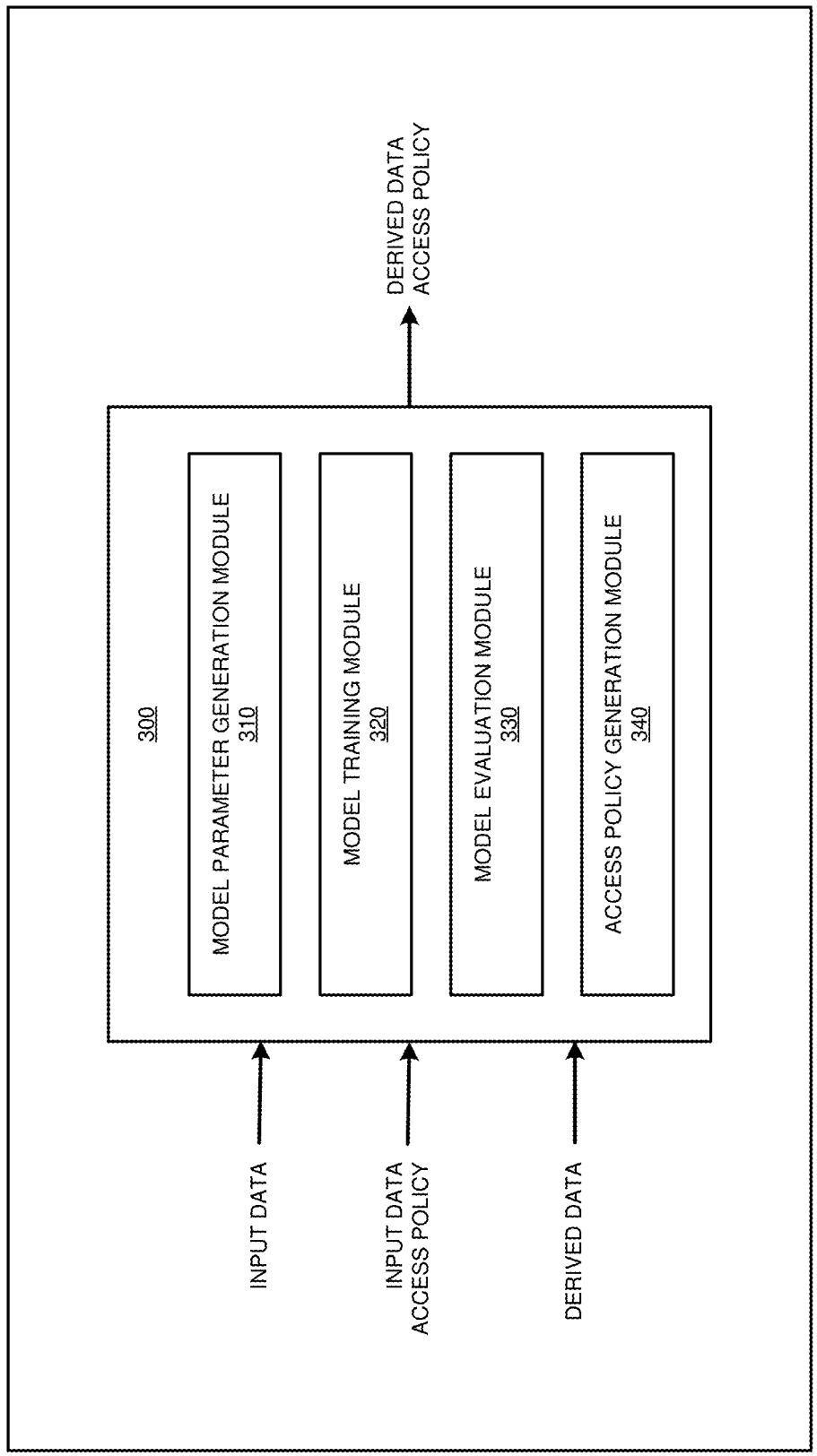
FIG. 3 depicts a block diagram of an example configuration for automatically adjusting data access policies in data analytics in accordance with an illustrative embodiment.

With reference to FIG. 3, this figure depicts a block diagram of an example configuration for automatically adjusting data access policies in data analytics in accordance with an illustrative embodiment. Application 300 is an example of application 105 in FIG. 1 and executes in any of servers 104 and 106, clients 110, 112, and 114, and device 132 in FIG. 1.

Model parameter generation module 310 generates one or more autoencoder networks from one or more model parameters. In implementations of module 310, one or more model parameters are set to default values, set by a human expert based on knowledge of the data to be processed by an analytics operation, generated automatically, or set using another presently known technique or combination of techniques.

Model training module 320 trains the generated autoencoder network according to one or more model parameters. Module 320 uses, as training data, a set of original data and a set of data derived from the original data. One implementation of module 320 uses, as a loss function during training, the reconstruction error of the autoencoder network when processing the training set of original data. Another implementation of module 320 uses, as a loss function during training, a difference between the encoded form of original training data (the output of the autoencoder network's encoder section) and corresponding derived training data. Another implementation of module 320 trains the autoencoder network to minimize both loss functions.

Once module 320 has trained the generated autoencoder network for the specified number of training epochs, model evaluation module 330 measures the network's reconstruction error and complexity level. To measure the network's complexity level, module 330 combines model parameters that relate to model complexity into a common complexity level. Because both the number of hidden layers in each of the encoder and decoder sections and the number of dimensions of the encoded form of the data are measures of complexity, one implementation of module 330 measures the network's complexity level by normalizing the number of hidden layers in each of the encoder and decoder sections and the number of dimensions of the encoded form of the data to a common scale and multiplying the two normalized values together. Another implementation of module 330 also includes a number of training epochs used in training a particularly-configured autoencoder network in the complexity level measurement.

Module 330 uses the complexity level as a confidence score corresponding to the reconstruction error of a generated autoencoder network.

Access policy generation module 340 aggregates one or more autoencoder networks' reconstruction error and corresponding complexity level into a level of difficulty score. The level of difficulty score represents a level of difficulty involved in using derived data output from an analytics operation to recover the initial data.

In one implementation of application 300, module 330 determines a level of difficulty score for an autoencoder network generated from an initial set of model parameters, and module 310 varies one or more model parameters from their initial setting and generates a corresponding set of autoencoder networks. Module 320 trains the generated set of autoencoder networks according to each network's model parameters. Module 330 measures each network's reconstruction error and complexity level, and module 340 aggregates the networks' reconstruction error and corresponding complexity level into a new level of difficulty score, in a manner described herein.

Access policy generation module 340 uses the level of difficulty score and a data access policy level of the initial data to determine a data access policy level of the derived data. For example, if the level of difficulty score is low (e.g. 1 on a 0-5 scale), indicating that recovering initial data from derived data is not difficult at all, the data access policy level of the derived data should be equal to the data access policy level of the initial data. On the other hand, if the level of difficulty score is high (e.g. 4.5 on a 0-5 scale), indicating that recovering initial data from derived data is very difficult, the data access policy level of the derived data can be lowered, or relaxed, relative to the data access policy level of the initial data.

Figure 4:
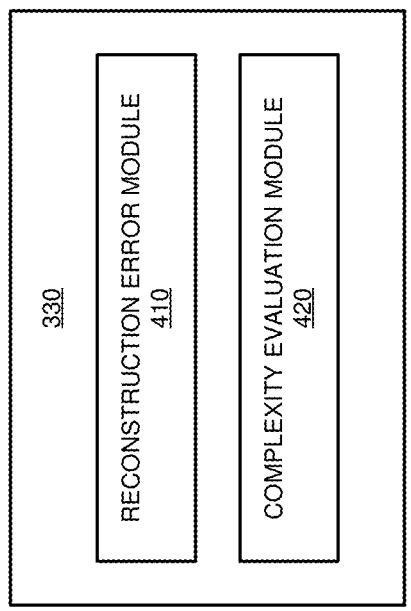
FIG. 4 depicts a block diagram of an example configuration for automatically adjusting data access policies in data analytics in accordance with an illustrative embodiment.

With reference to FIG. 4, this figure depicts a block diagram of an example configuration for automatically adjusting data access policies in data analytics in accordance with an illustrative embodiment. In particular, FIG. 4 depicts more detail of model evaluation module 330 in in FIG. 3.

Reconstruction error module 410 measures an autoencoder network's reconstruction error. Complexity evaluation module 420 measures an autoencoder network's complexity level, by combining model parameters that relate to model complexity into a common complexity level. Because both the number of hidden layers in each of the encoder and decoder sections and the number of dimensions of the encoded form of the data are measures of complexity, one implementation of module 420 measures the network's complexity level by normalizing the number of hidden layers in each of the encoder and decoder sections and the number of dimensions of the encoded form of the data to a common scale and multiplying the two normalized values together. Another implementation of module 420 also includes a number of training epochs used in training a particularly-configured autoencoder network in the complexity level measurement.

Figure 5:
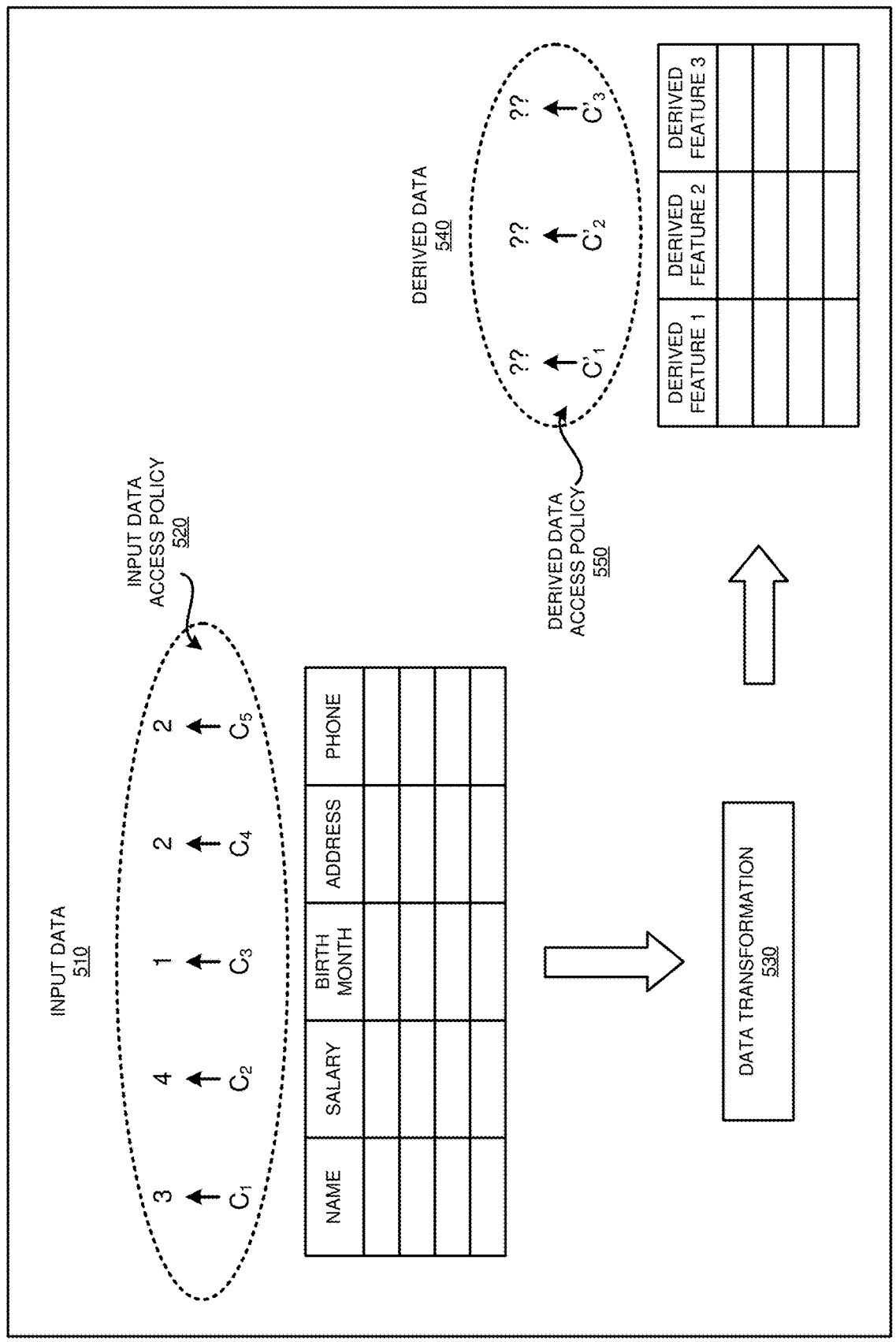
FIG. 5 depicts an example of automatically adjusting data access policies in data analytics in accordance with an illustrative embodiment.

With reference to FIG. 5, this figure depicts an example of automatically adjusting data access policies in data analytics in accordance with an illustrative embodiment. The example can be executed using application 300 in FIG. 3.

As depicted, input data 510 is subject to input data access policy 520. Input data access policy 520 includes a set of data access policy levels, each applicable to a particular attribute or column of input data 510. For example, a particular individual's salary data has a data access policy level of 4 (on a 1-5 scale), because salary data requires a high level of protection, while a particular individual's birth month has a data access policy level of 1 (on a 1-5 scale), because birth month, without additional data, requires a comparatively lower level of protection.

Input data 510 is processed by data transformation 530, resulting in derived data 540. Application 300 determines values for the policy levels in derived data access policy 550.

Figure 6:
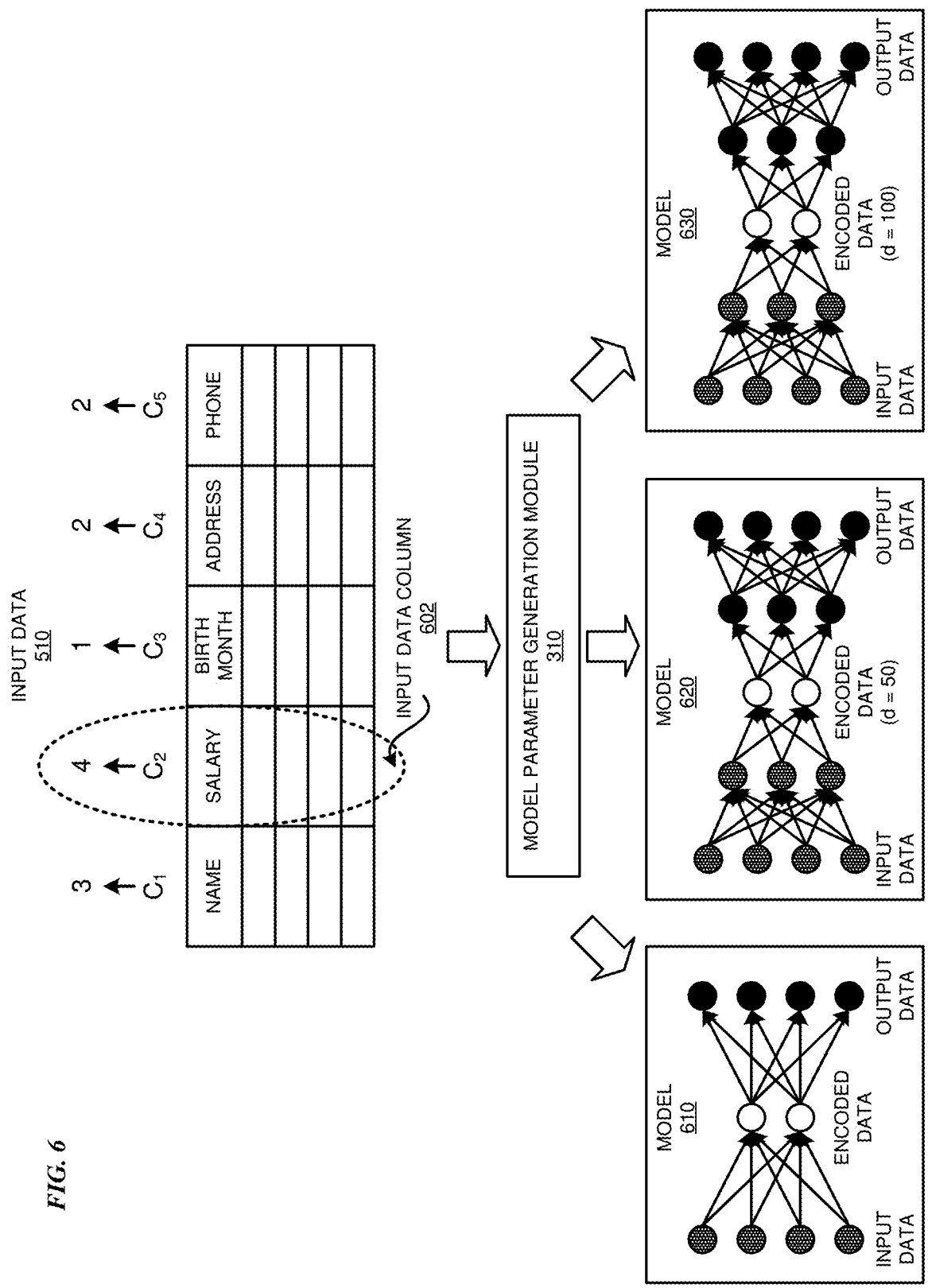
FIG. 6 depicts a continued example of automatically adjusting data access policies in data analytics in accordance with an illustrative embodiment.

With reference to FIG. 6, this figure depicts a continued example of automatically adjusting data access policies in data analytics in accordance with an illustrative embodiment. Model parameter generation module 310 is the same as model parameter generation module 310 in FIG. 3. Input data 510 is the same as Input data 510 in FIG. 5.

Input data 510 includes input data column 602, holding salary data. Application 300 will determine a value for a derived data access policy for data derived from the data in input data column 602.

Model parameter generation module 310 generates a set of autoencoder networks by varying one or more model parameters. In particular, model 610 does not have a hidden layer. Model 620 has one hidden layer in each of the encoder and decoder sections, and generates encoded data with a dimension of fifty. Model 630 has one hidden layer in each of the encoder and decoder sections, and generates encoded data with a dimension of one hundred. The depictions of models 610, 620, and 630 depict each model symbolically, and are not intended as exact representations of each model.

Figure 7:
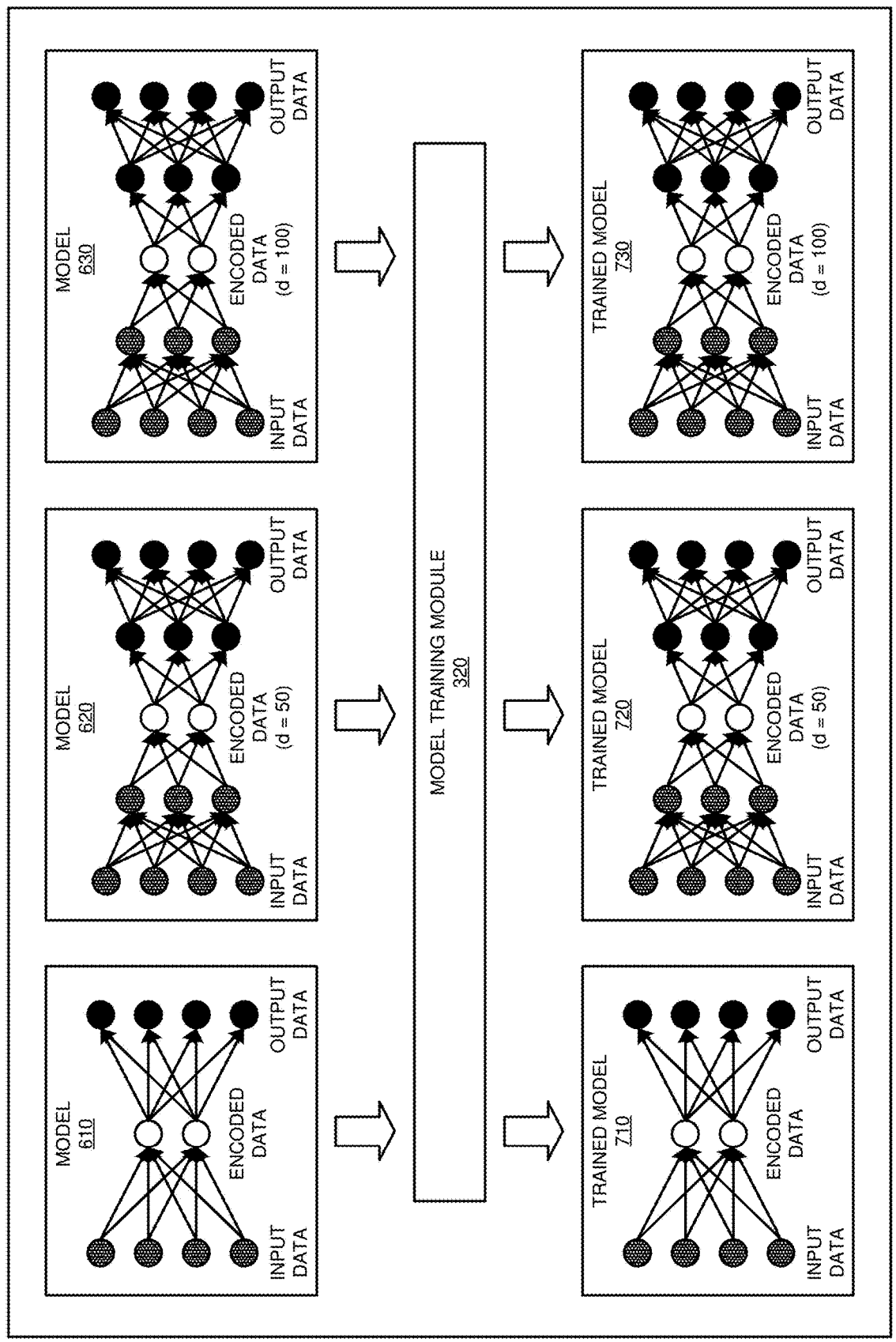
FIG. 7 depicts a continued example of automatically adjusting data access policies in data analytics in accordance with an illustrative embodiment.

With reference to FIG. 7, this figure depicts a continued example of automatically adjusting data access policies in data analytics in accordance with an illustrative embodiment. Model training module 320 is the same as model training module 320 in FIG. 3. Models 610, 620, and 630 are the same as models 610, 620, and 630 in FIG. 6.

As depicted, model training module 320 trains model 610 according to one or more model parameters, producing trained model 710. Model training module 320 trains model 620 according to one or more model parameters, producing trained model 720. Model training module 320 trains model 630 according to one or more model parameters, producing trained model 730.

Figure 8:
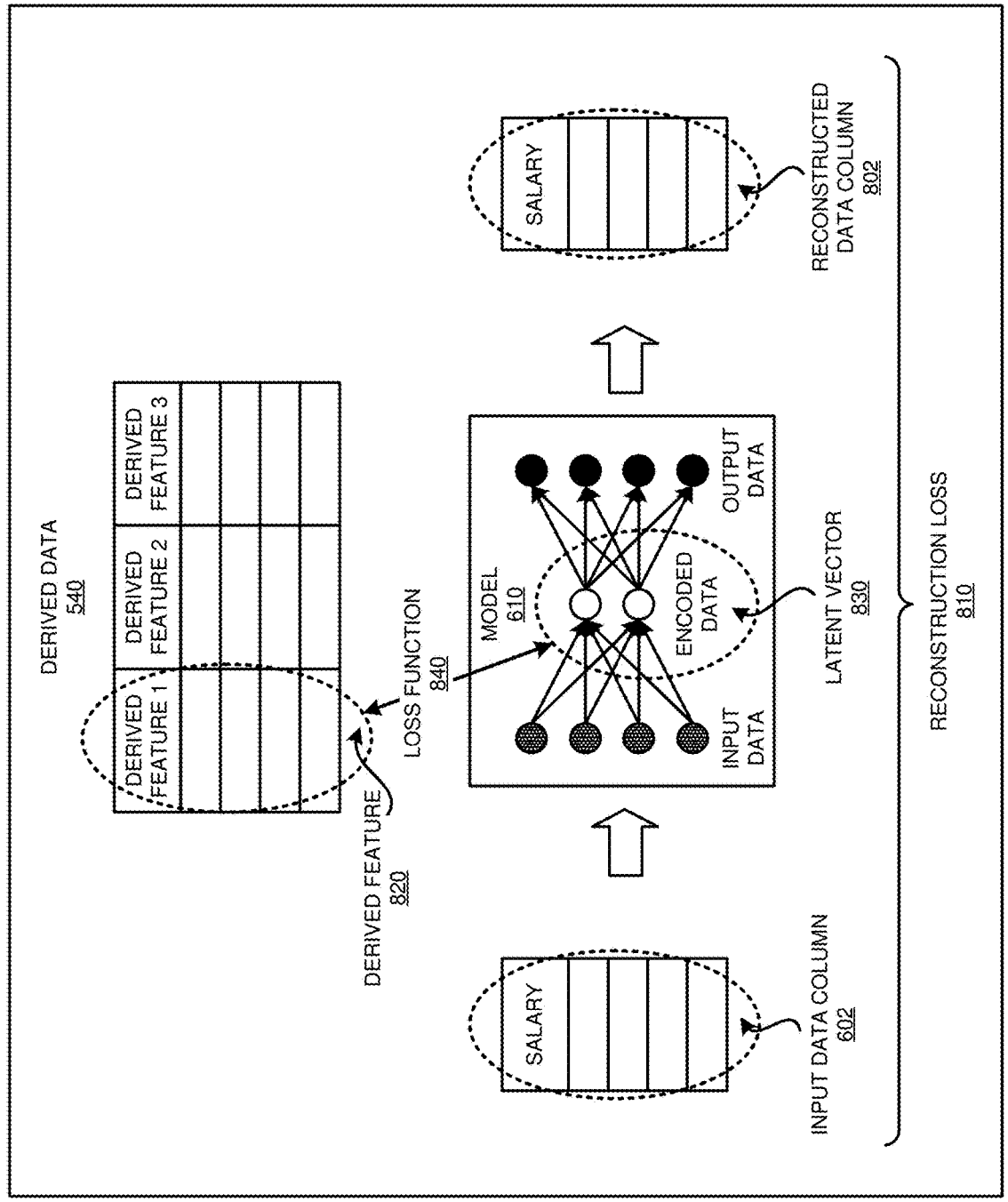
FIG. 8 depicts a continued example of automatically adjusting data access policies in data analytics in accordance with an illustrative embodiment.

With reference to FIG. 8, this figure depicts a continued example of automatically adjusting data access policies in data analytics in accordance with an illustrative embodiment. Derived data 540 is the same as derived data 540 in FIG. 5. Input data column 602 and model 610 are the same as input data column 602 and model 610 in FIG. 6.

FIG. 8 depicts more detail of the training of model 610. One loss function used during training is reconstruction loss 810, the reconstruction error of model 610 when processing input data column 602 to generate reconstructed data column 802. Another loss function used during training is loss function 840, a difference between latent vector 830, the output of the autoencoder network's encoder section, and derived feature 820 in derived data 540.

Figure 9:
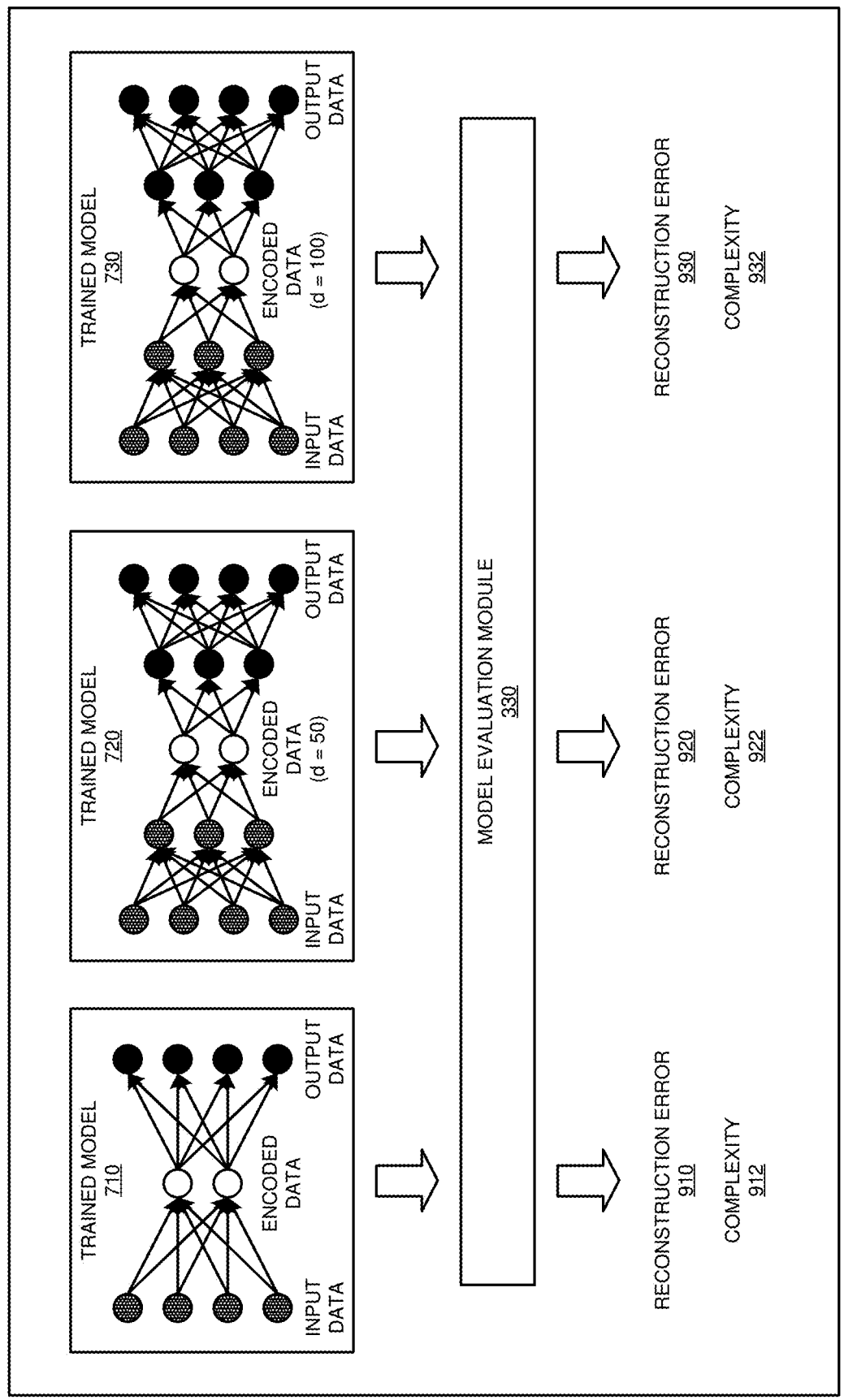
FIG. 9 depicts a continued example of automatically adjusting data access policies in data analytics in accordance with an illustrative embodiment.

With reference to FIG. 9, this figure depicts a continued example of automatically adjusting data access policies in data analytics in accordance with an illustrative embodiment. Model evaluation module 330 is the same as model evaluation module 330 in FIG. 3. Trained models 710, 720, and 730 are the same as trained models 710, 720, and 730 in FIG. 7.

Model evaluation module 330 measures the reconstruction error and complexity level of each of trained models 710, 720, and 730. In particular, module 330 measures reconstruction error 910 and complexity 912 of trained model 710. Module 330 measures reconstruction error 920 and complexity 922 of trained model 720. Module 330 measures reconstruction error 930 and complexity 932 of trained model 730.

Figure 10:
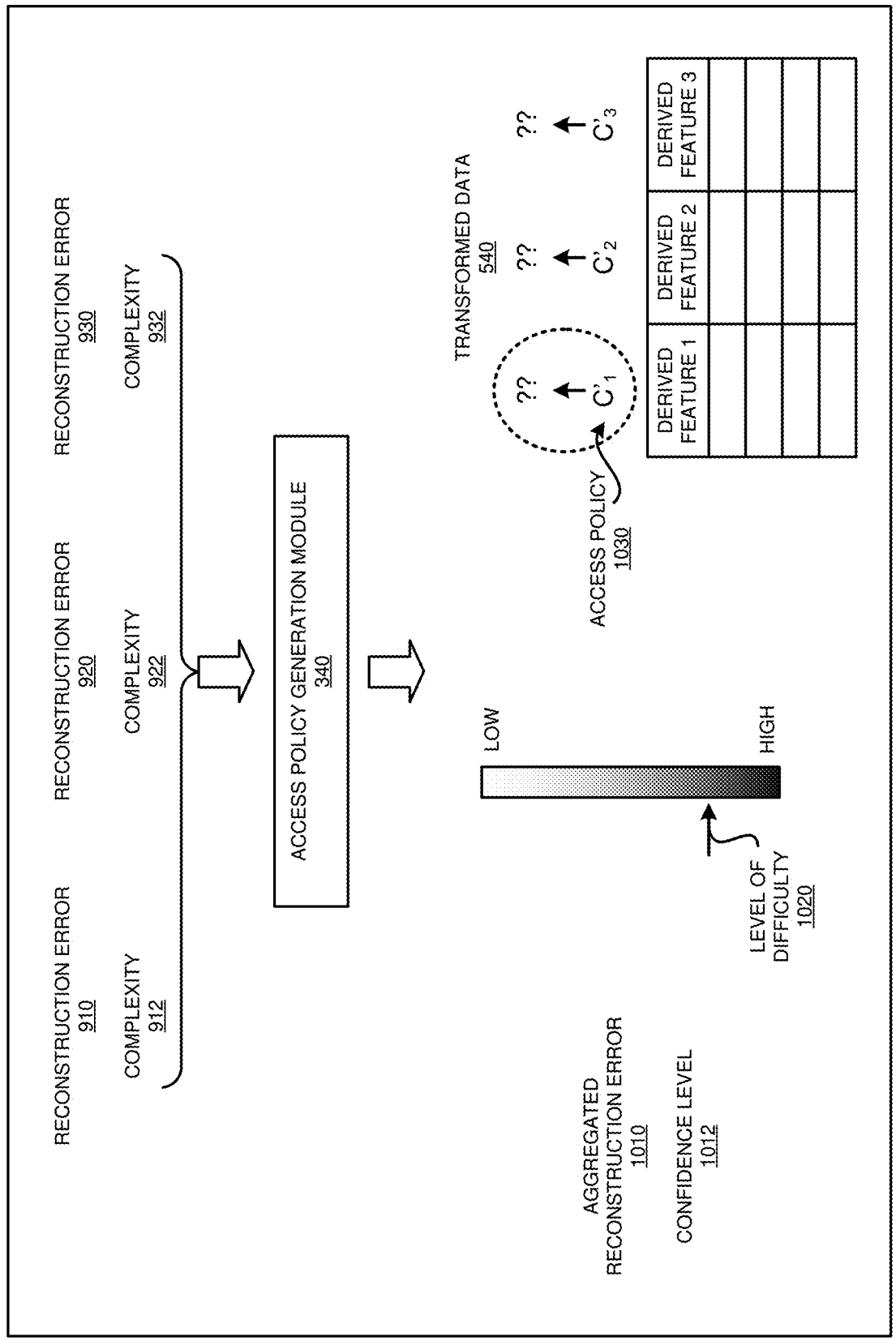
FIG. 10 depicts a continued example of automatically adjusting data access policies in data analytics in accordance with an illustrative embodiment.

With reference to FIG. 10, this figure depicts a continued example of automatically adjusting data access policies in data analytics in accordance with an illustrative embodiment. Access policy generation module 340 is the same as access policy generation module 340 in FIG. 3. Reconstruction errors 910, 920, and 930 and complexities 912, 922, and 932 are the same as reconstruction errors 910, 920, and 930 and complexities 912, 922, and 932 in FIG. 9.

Access policy generation module 340 aggregates reconstruction errors 910, 920, and 930 and complexities 912, 922, and 932 into aggregated reconstruction error 1010 and confidence level 1012, determines level of difficulty score 1020, and uses score 1020 and a data access policy level of the initial data to determine access policy level 1030 for derived data 540.

Figure 11:
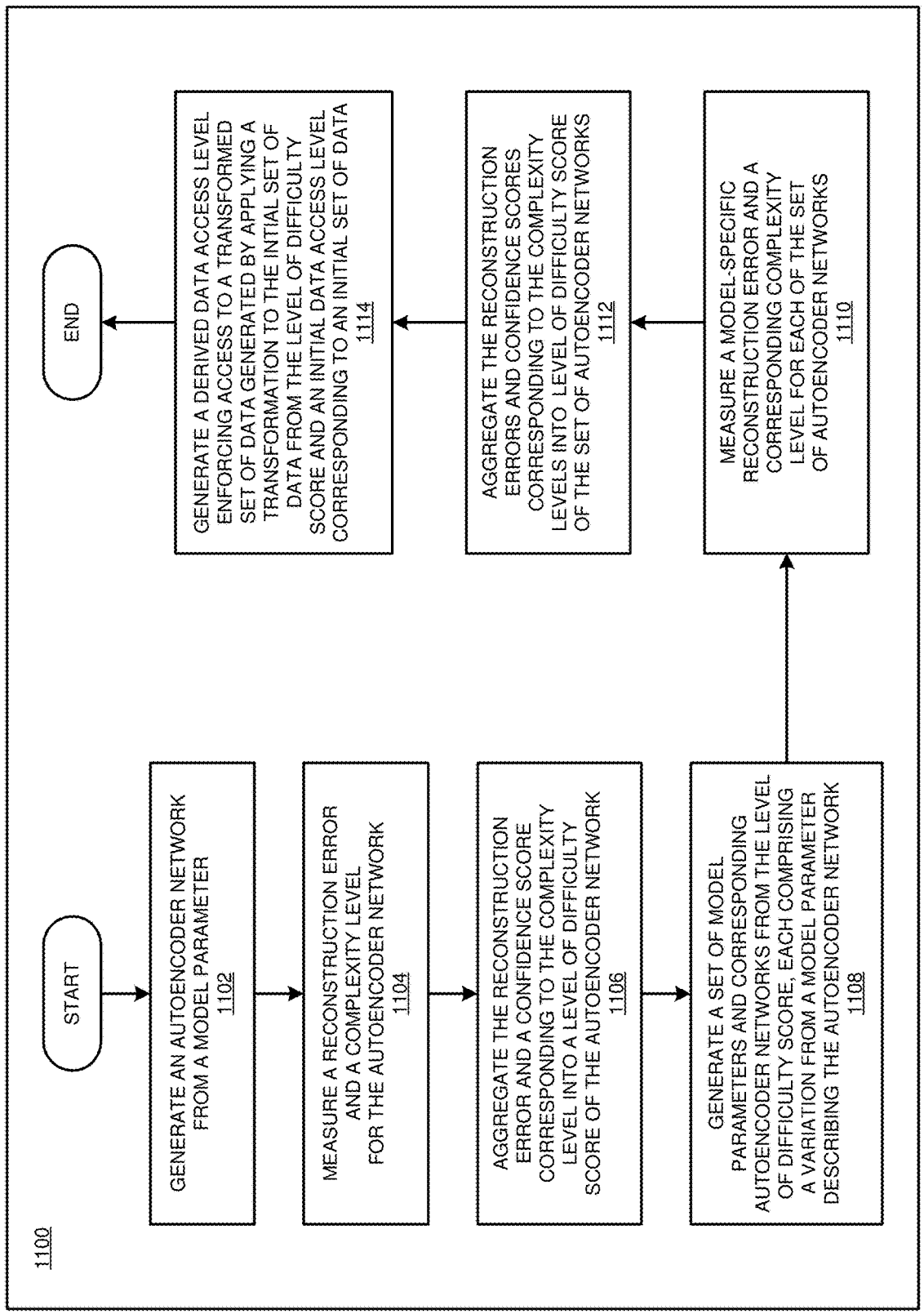
FIG. 11 depicts a flowchart of an example process for automatically adjusting data access policies in data analytics in accordance with an illustrative embodiment.

With reference to FIG. 11, this figure depicts a flowchart of an example process for automatically adjusting data access policies in data analytics in accordance with an illustrative embodiment. Process 1100 can be implemented in application 300 in FIG. 3.

In block 1102, the application generates an autoencoder network from a model parameter. In block 1104, the application measures a reconstruction error and a complexity level for the autoencoder network. In block 1106, the application aggregates the reconstruction error and a confidence score corresponding to the complexity level into a level of difficulty score of the autoencoder network. In block 1108, the application generates a set of model parameters and corresponding autoencoder networks from the level of difficulty score, each comprising a variation from a model parameter describing the autoencoder network. In block 1110, the application measures a model-specific reconstruction error and a corresponding complexity level for each of the set of autoencoder networks. In block 1112, the application aggregates the reconstruction errors and confidence scores corresponding to the complexity levels into level of difficulty score of the set of autoencoder networks. In block 1114, the application generates a derived data access level enforcing access to a transformed set of data generated by applying a transformation to the initial set of data from the level of difficulty score and an initial data access level corresponding to an initial set of data. Then the application ends.

Figure 12:
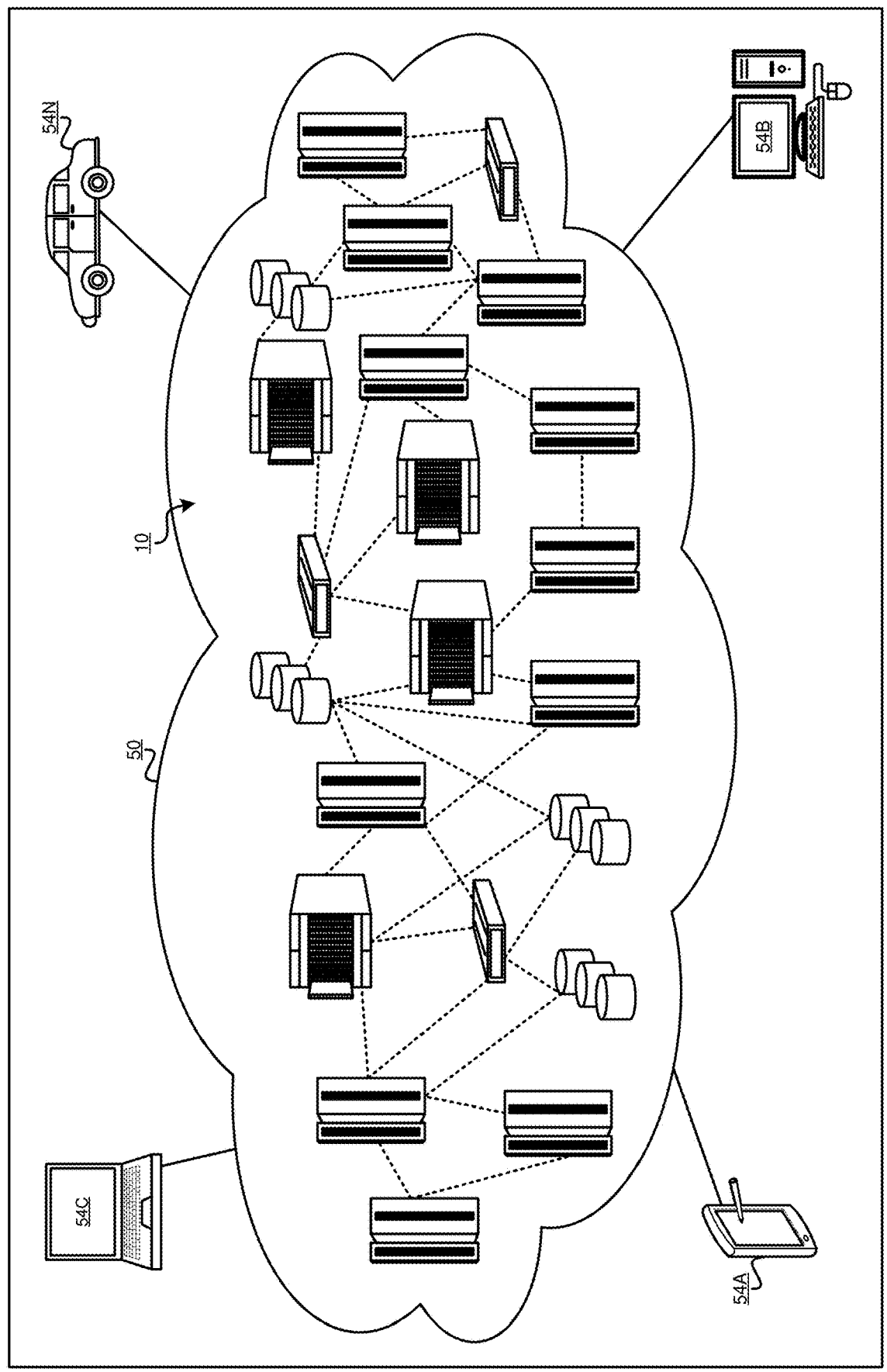
FIG. 12 depicts a cloud computing environment according to an embodiment of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 13:
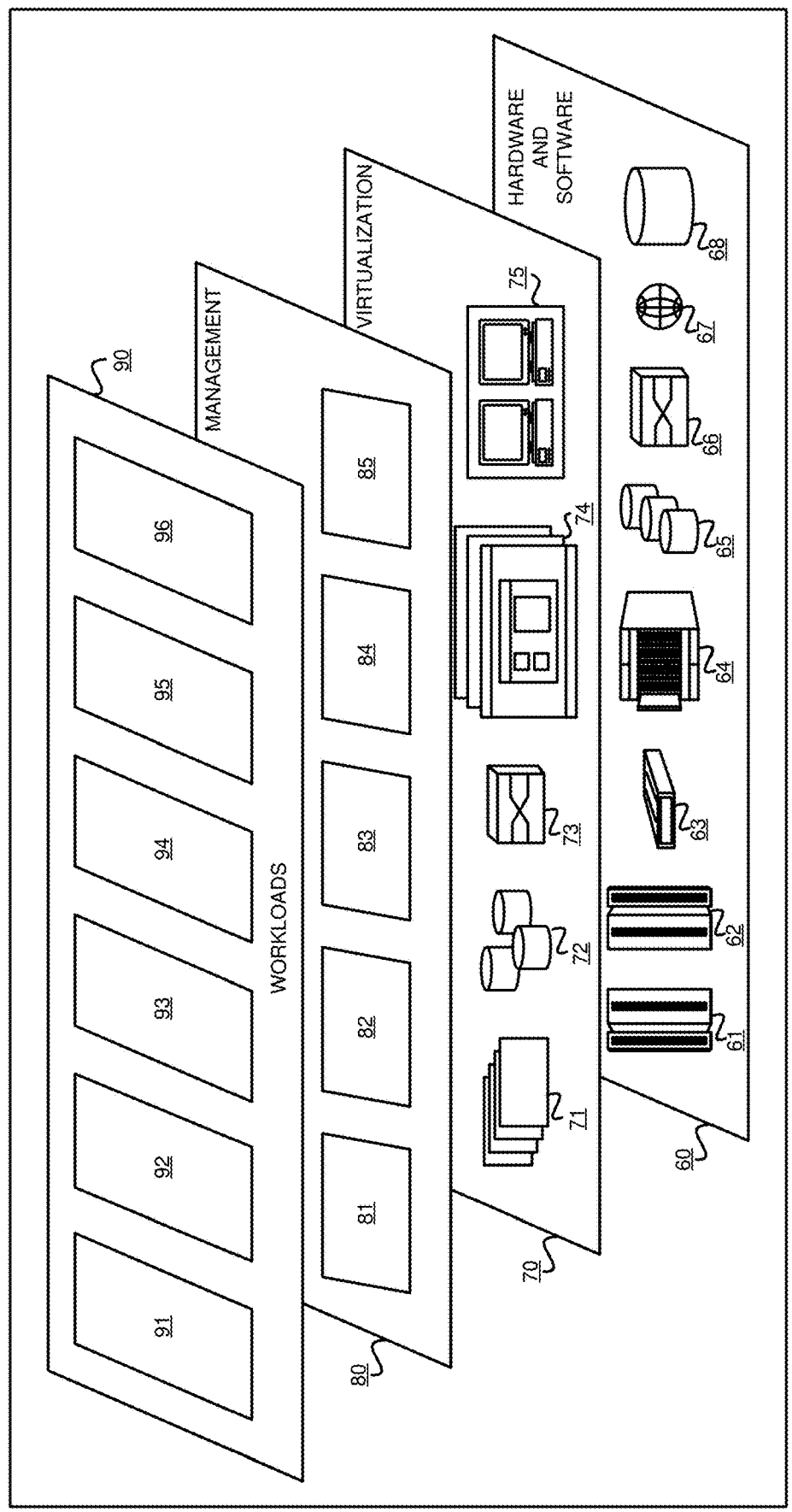
FIG. 13 depicts abstraction model layers according to an embodiment of the present invention.

Referring now to FIG. 13, a set of functional abstraction layers provided by cloud computing environment 50 (FIG. 12) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for automatically adjusting data access policies in data analytics and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
generating, from a first model parameter, an autoencoder network;
generating, by applying a transformation to an input, and corresponding to a portion of an initial set of data of the input, an output from the autoencoder network;
producing a reconstructed input by performing an inverse transformation operation on the output from the autoencoder network;
measuring a reconstruction error for the autoencoder network, the measuring the reconstruction error comprising computing a difference between the input to the autoencoder network and the reconstructed input;
aggregating, into a level of difficulty score of the autoencoder network, the reconstruction error and a complexity level of the autoencoder network, the level of difficulty score representing difficulty of using the output to recover the input;
generating, from the level of difficulty score and an initial data access policy level enforcing access to the initial set of data, a derived data access policy level corresponding to the initial data access policy level, the derived data access policy level enforcing access to an output set of data of the output from the autoencoder network wherein the generating comprises:
lowering, relative to the initial data access policy level, the derived data access policy level, the lowering performed responsive to determining that the level of difficulty score is above a predetermined score; and
setting the derived data access policy level for the output set of data set corresponding to a portion of the output from the autoencoder network.

2. The computer-implemented method of claim 1, further comprising:
training, using a training subset of the initial set of data, the autoencoder network.

3. The computer-implemented method of claim 2, wherein the training is performed to minimize a reconstruction error of the autoencoder network.

4. The computer-implemented method of claim 2, wherein the training is performed to minimize a difference between an output of an encoder portion of the autoencoder network and a transformed set of training data, the transformed set of training data generated by applying the transformation to the training subset.

5. The computer-implemented method of claim 1, further comprising:
measuring, for the autoencoder network, the complexity level.

6. The computer-implemented method of claim 1, further comprising:
generating, from the level of difficulty score, a set of model parameters, a second model parameter in the set of model parameters comprising a variation from the first model parameter;
generating, from the set of model parameters, a set of autoencoder networks;
measuring a model-specific reconstruction error of each autoencoder network in the set of autoencoder networks, the model-specific reconstruction error comprising a difference between an input to an autoencoder network in the set of autoencoder networks and a corresponding output from the autoencoder network in the set of autoencoder networks, the input to the autoencoder network in the set of autoencoder networks comprising the portion of the initial set of data; and
aggregating, into a level of difficulty score of the set of autoencoder networks, the model-specific reconstruction error of each autoencoder network and a complexity level corresponding to each model-specific reconstruction error.

7. The computer-implemented method of claim 1, wherein the first model parameter comprises a number of hidden layers in an encoder portion of the autoencoder network and a number of hidden layers in a decoder portion of the autoencoder network.

8. The computer-implemented method of claim 1, wherein the first model parameter comprises a number of dimensions in an output of an encoder portion of the autoencoder network.

9. The computer-implemented method of claim 1, wherein the generating comprises setting, responsive to determining that the level of difficulty score is below a second predetermined score, the derived data access policy level to the initial data access policy level.

10. A computer program product for automatically adjusting a data access policy, the computer program product comprising: one or more computer readable storage media, and program instructions collectively stored on the one or more computer readable storage media, the program instructions comprising:
program instructions to generate, from a first model parameter, an autoencoder network;
program instructions to generate, by applying a transformation to an input, and corresponding to a portion of an initial set of data of the input, an output from the autoencoder network;
program instructions to produce a reconstructed input by performing an inverse transformation operation on the output from the autoencoder network;
program instructions to measure a reconstruction error for the autoencoder network, the measuring the reconstruction error comprising computing a difference between an input to the autoencoder network and the reconstructed input;
program instructions to aggregate, into a level of difficulty score of the autoencoder network, the reconstruction error and a complexity level of the autoencoder network, the level of difficulty score representing difficulty of using the output to recover the input;
program instructions to generate, from the level of difficulty score and an initial data access policy level enforcing access to the initial set of data, a derived data access policy level corresponding to the initial data access policy level, the derived data access policy level enforcing access to an output set of data of the output from the autoencoder network wherein the generating comprises:
lowering, relative to the initial data access policy level, the derived data access policy level, the lowering performed responsive to determining that the level of difficulty score is above a predetermined score; and
setting the derived data access policy level for the output set of data set corresponding to a portion of the output from the autoencoder network.

11. The computer program product of claim 10, further comprising:
program instructions to train, using a training subset of the initial set of data, the autoencoder network, wherein the training is performed to minimize a reconstruction error of the autoencoder network.

12. The computer program product of claim 11, wherein the training is performed to minimize a difference between an output of an encoder portion of the autoencoder network and a transformed set of training data, the transformed set of training data generated by applying the transformation to the training subset.

13. The computer program product of claim 10, further comprising:
program instructions to measure, for the autoencoder network, the complexity level.

14. The computer program product of claim 10, further comprising:
program instructions to generate, from the level of difficulty score, a set of model parameters, a second model parameter in the set of model parameters comprising a variation from the first model parameter;
program instructions to generate, from the set of model parameters, a set of autoencoder networks;
program instructions to measure a model-specific reconstruction error of each autoencoder network in the set of autoencoder networks, the model-specific reconstruction error comprising a difference between an input to an autoencoder network in the set of autoencoder networks and a corresponding output from the autoencoder network in the set of autoencoder networks, the input to the autoencoder network in the set of autoencoder networks comprising the portion of the initial set of data; and
program instructions to aggregate, into a level of difficulty score of the set of autoencoder networks, the model-specific reconstruction error of each autoencoder network and a complexity level corresponding to each model-specific reconstruction error.

15. The computer program product of claim 10, wherein the first model parameter comprises a number of hidden layers in an encoder portion of the autoencoder network and a number of hidden layers in a decoder portion of the autoencoder network.

16. The computer program product of claim 10, wherein the first model parameter comprises a number of dimensions in an output of an encoder portion of the autoencoder network.

17. The computer program product of claim 10, wherein the stored program instructions are stored in the at least one of the one or more storage media of a local data processing system, and wherein the stored program instructions are transferred over a network from a remote data processing system.

18. The computer program product of claim 10, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 10, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to generate, from a first model parameter, an autoencoder network;
program instructions to generate, by applying a transformation to an input, and corresponding to a portion of an initial set of data of the input, an output from the autoencoder network;
program instructions to produce a reconstructed input by performing an inverse transformation operation on the output from the autoencoder network;
program instructions to measure a reconstruction error for the autoencoder network, the measuring the reconstruction error comprising computing a difference between an input to the autoencoder network and the reconstructed input;
program instructions to aggregate into a level of difficulty score of the autoencoder network, the reconstruction error and a complexity level of the autoencoder network, the level of difficulty score representing difficulty of using the output to recover the input;
program instructions to generate, from the level of difficulty score and an initial data access policy level enforcing access to the initial set of data, a derived data access policy level corresponding to the initial data access policy level, the derived data access policy level enforcing access to an output set of data of the output from the autoencoder network wherein the generating comprises:
lowering, relative to the initial data access policy level, the derived data access policy level, the lowering performed responsive to determining that the level of difficulty score is above a predetermined score; and
setting the derived data access policy level for the output set of data set corresponding to a portion of the output from the autoencoder network.

* * * * *